US012596230B2

(12) United States Patent
Hassan et al.

(10) Patent No.: US 12,596,230 B2
(45) Date of Patent: Apr. 7, 2026

(54) METHOD FOR MANUFACTURING A PHOTONIC CHIP

(71) Applicant: COMMISSARIAT A L'ENERGIE ATOMIQUE ET AUX ENERGIES ALTERNATIVES, Paris (FR)

(72) Inventors: Karim Hassan, Grenoble (FR); Bertrand Szelag, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 301 days.

(21) Appl. No.: 18/327,362

(22) Filed: Jun. 1, 2023

(65) Prior Publication Data

US 2023/0393338 A1      Dec. 7, 2023

(30) Foreign Application Priority Data

Jun. 1, 2022      (FR) ..................................... 22 05261

(51) Int. Cl.
*G02B 6/13*            (2006.01)
*G02B 6/132*           (2006.01)
(Continued)

(52) U.S. Cl.
CPC ............. *G02B 6/132* (2013.01); *G02B 6/136* (2013.01); *G02B 2006/12061* (2013.01); (Continued)

(58) Field of Classification Search
CPC .................... G02B 6/132; G02B 6/136; G02B 2006/12061; G02B 2006/121; G02B 2006/12173; G02B 2006/12197 (Continued)

(56) References Cited

U.S. PATENT DOCUMENTS 8,358,897 B1      1/2013 Fish et al.
2007/0200144 A1   8/2007 Aspar et al.
(Continued)

FOREIGN PATENT DOCUMENTS

EP          3 264 541 A1      1/2018

OTHER PUBLICATIONS

Bakir et al., "Hybrid Si/III-V Lasers with Adiabatic Coupling", 8th IEEE International Conference on Group IV Photonics, 2011, 3 pages.
(Continued)

*Primary Examiner* — Jerry M Blevins
(74) *Attorney, Agent, or Firm* — Oblon, McClelland, Maier & Neustadt, L.L.P.

(57) ABSTRACT

This method comprises:
  before bonding a substrate to a layer of encapsulated semiconductor material in which a first part of an optical component is produced, producing indented pads inside a buried layer of silicon oxide, with each of these pads comprising an embedded face that extends parallel to an interface between the buried layer and the layer of encapsulated semiconductor material to a predetermined depth inside the buried layer, with each of the embedded faces being made of a material different from silicon oxide; then
  thinning the buried layer in order to leave a residual silicon oxide layer on the layer of encapsulated semiconductor material, with this thinning comprising an operation involving thinning the buried layer, with this thinning stopping as soon as the embedded face of the pads is exposed.

12 Claims, 4 Drawing Sheets

(51) Int. Cl.
  *G02B 6/136* (2006.01)
  *G02B 6/12* (2006.01)

(52) U.S. Cl.
  CPC .................. *G02B 2006/121* (2013.01); *G02B 2006/12173* (2013.01); *G02B 2006/12197* (2013.01)

(58) Field of Classification Search
  USPC ......................................................... 385/130
  See application file for complete search history.

(56) References Cited

U.S. PATENT DOCUMENTS

| | | | |
|---|---|---|---|
| 2010/0176397 A1 | 7/2010 | Aspar et al. | |
| 2013/0343705 A1* | 12/2013 | Vermeulen ............. | G02B 6/126 |
| | | | 385/37 |
| 2017/0237229 A1 | 8/2017 | Menezo | |
| 2018/0006427 A1 | 1/2018 | Sciancalepore et al. | |
| 2018/0323574 A1 | 11/2018 | Caër et al. | |
| 2018/0323575 A1* | 11/2018 | Caër .......................... | H01S 5/50 |
| 2022/0260779 A1* | 8/2022 | Yang .................... | G02B 6/1228 |

OTHER PUBLICATIONS

French Preliminary Search Report & Written Opinion Issued Jan. 30, 2023 in French Application 22 05261 filed on Jun. 1, 2022 (with English Translation of Categories of Cited Documents), 10 pages.

* cited by examiner

METHOD FOR MANUFACTURING A PHOTONIC CHIP

The invention relates to a method for manufacturing a photonic chip and to a photonic chip manufactured using this method.

Photonic chips often comprise parts of optical components that are optically or capacitively coupled to each other through a thin layer of dielectric material, also referred to in this text as "thin dielectric layer". The thickness of this thin dielectric layer is less than the thickness of the buried silicon oxide layer of standard SOI (Silicon-On-Insulator) substrates. Thus, in order to manufacture such a photonic chip from a standard SOI substrate, it has been proposed for the thin dielectric layer to be obtained by thinning the buried layer of a standard SOI substrate. Such a manufacturing method is disclosed, for example, in application US 2017/0237229. This method is advantageous in that it uses standard SOI substrates and therefore in that it can be easily implemented.

However, when the thin dielectric layer is obtained by thinning the buried layer of a standard SOI substrate, the precision with respect to the thickness of the thin dielectric layer is low. However, an error in the thickness of this thin dielectric layer changes the coupling between the two parts of the optical components and therefore the performance capabilities of the manufactured photonic chip.

The prior art is also known from: US 2011/8323575 A1, U.S. Pat. No. 8,358,897 B1, EP 3264541 A1 and US 2007/200144 A1.

It is therefore beneficial for a method to be proposed for manufacturing such a photonic chip that allows the use of a standard SOI substrate, while improving the precision with respect to the thickness of the thin dielectric layer.

Therefore, the aim of the invention is such a manufacturing method.

A further aim of the invention is a photonic chip manufactured using the aforementioned manufacturing method.

The invention will be better understood upon reading the following description, which is provided solely by way of a non-limiting example and with reference to the drawings, in which.

Throughout these figures, the same reference signs are used to designate the same elements.

Throughout the remainder of this description, the features and functions that are well known to a person skilled in the art are not described in detail.

Figures 1, 2, 3, 4, 5, 6:
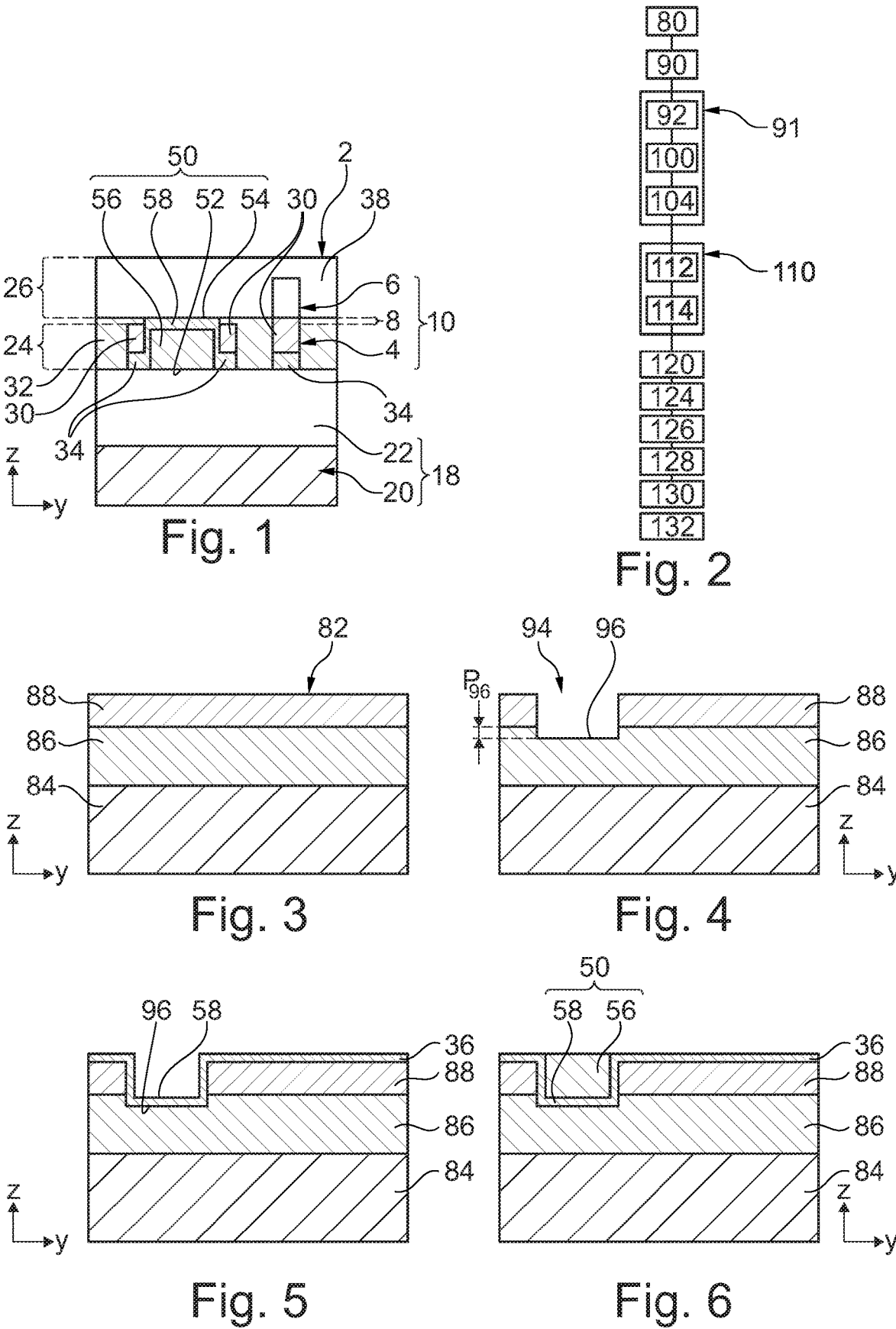
FIG. 1 is a schematic and partial illustration, as a vertical section view, of a photonic chip comprising parts of optical components coupled together through a thin dielectric layer.
FIG. 2 is a flow chart of a method for manufacturing the photonic chip of FIG. 1.
FIGS. 3 to 11 are partial schematic illustrations, as a vertical section view, of various manufacturing states encountered when implementing the method of FIG. 2.

FIG. 1 shows a photonic chip 2 comprising photonic components that guide and/or modulate the phase or the amplitude of an optical signal. Typically, the wavelength of the guided and/or modulated optical signal ranges between 1,250 nm and 1,590 nm.

In practice, such a photonic chip 2 comprises a plurality of optical components. For example, each of these optical components is selected from the group made up of the following optical components:

a waveguide;

a laser source;

a phase and/or amplitude modulator;

an optical filter;

a mirror;

an interface for connecting the photonic chip to an optical fibre.

More specifically, the photonic chip 2 comprises:

at least two parts of optical components optically coupled to each other by means of an optical coupling; or at least two parts of optical components capacitively coupled to each other by means of a capacitive coupling.

In FIG. 1, the parts of optical components coupled to each other by means of optical or capacitive coupling are denoted using numerical reference signs 4 and 6, respectively.

By way of an illustration, parts of optical components optically coupled to each other are typically portions of waveguides that are close enough to each other so that at least 50%, and preferably more than 80%, of the power of the optical signal propagating in one of these two waveguides is transmitted to the other one of these two waveguides. For example, such optical coupling is adiabatic coupling as described in detail in the following article: B. Ben Bakir et al., "Hybrid Si/III-V lasers with adiabatic coupling", 2011.

Parts of optical components capacitively coupled to each other are, for example, the two electrodes of a phase and/or amplitude modulator. Such a modulator is disclosed, for example, in application US 2017/0237229.

In order to achieve such optical or capacitive coupling, the two parts 4 and 6 of optical components are separated from each other by a thin dielectric layer 8. A thin dielectric layer is a layer of dielectric material with a thickness of less than 250 nm and, typically, less than 150 nm. In the case of optical coupling, the thickness of the thin dielectric layer often ranges between 100 nm and 250 nm or between 100 nm and 200 nm. In the case of capacitive coupling, the thickness of the thin dielectric layer generally ranges between 5 nm and 50 nm and most often ranges between 5 nm and 30 nm or between 5 nm and 20 nm. In order to remain compatible with the use of a standard SOI substrate to manufacture the photonic chip 2, the thin dielectric layer is a thin silicon oxide layer.

In order to simplify FIG. 1 and the following figures, only a portion of the photonic chip 2 comprising the two parts 4 and 6 of optical components coupled together through the thin dielectric layer 8 is shown.

In this case, the description is provided in the particular case where the parts 4 and 6 are, respectively, the lower electrode and the upper electrode of a phase and/or amplitude modulator 10 of the optical signal. In this particular case, the parts 4 and 6 of optical components are capacitively coupled to each other. For example, the architecture of the modulator 10 is identical or similar to the architecture of the modulator described in application US 2017/0237229. Thus, hereafter, the precise architecture of the modulator 10 is not described in detail. However, everything described hereafter in this particular case also applies to the case where the parts 4 and 6 are coupled to each other by means of optical coupling.

The figures are oriented with respect to an orthogonal XYZ reference frame. The X and Y directions are horizontal. The X direction is perpendicular to the cutting plane. The Z direction is vertical. Throughout this text, terms such as "above", "below", "upper", "lower" are defined relative to the Z direction.

The photonic chip 2 successively comprises, from the bottom to the top:— a substrate 18 made up of, from the bottom to the top, a support 20 and a layer 22 of dielectric material;

a layer 24 of encapsulated semiconductor material, directly located on an upper face of the layer 22 of dielectric material;

the thin layer 8 of silicon oxide; and a layer 26, inside which the part 6 is encapsulated.

The thickness of the support 20 is typically greater than 200 μm or 400 μm. For example, the support 20 is made of silicon or of polycrystalline silicon.

The layer 22 is made of a dielectric material having optical and electrical properties similar or identical to the optical and electrical properties of silicon oxide. In this embodiment, the layer 22 is a silicon oxide layer. The thickness of the layer 22 is typically greater than 500 nm or 1 μm or more. Throughout this text, a dielectric material is a material with electrical conductivity at 20° C. that is less than 10-7 S/m and, preferably, less than 10-9 S/m or 10-15 S/m. Furthermore, its refractive index is lower than the refractive index of the encapsulated semiconductor material in the layer 24.

The layer 24 contains a semiconductor material 30, in which the part 4 encapsulated in a dielectric encapsulation material 32 is produced. As with the layer 22, the dielectric encapsulation material 32 is a dielectric material with optical and electrical properties that are close or identical to those of silicon oxide. In this example, the material 32 is silicon oxide.

In this embodiment, the semiconductor material 30 is single-crystal silicon. Thus, the part 4 is made of single-crystal silicon. For example, the thickness of the single-crystal silicon in the layer 24 ranges between 100 nm and 800 nm and typically between 300 nm and 500 nm. Still in this embodiment, the layer 24 also comprises residues 34 of a masking layer 36 (FIG. 5) used to structure the single-crystal silicon in order to produce the parts of optical components encapsulated inside the layer 24. These residues 34 are located inside the layer 24 and each extend along the interface between the layers 22 and 24. In this case, one such residue 34 separates the lower end of the part 4 from the layer 22. The masking layer 36 and the residues 34 are made, in this embodiment, of a dielectric material different from silicon oxide. In this case, the layer 36 is made of silicon nitride.

The thickness of the residues 34 and of the layer 36 is typically three or five times less than the thickness of the single-crystal silicon 30 encapsulated in the layer 24. For example, the thickness of the layer 36 is less than 100 nm.

The layer 26 comprises the part 6 of an optical component encapsulated inside a dielectric encapsulation material 38. The material 38 can be the same as the material 32 or can be a different dielectric material from the material 32. In this case, the material 38 is the same as the material 32. Therefore, the material 38 is silicon oxide. The part 6 of an optical component is made of the same material as the part 4 of an optical component or of another semiconductor material, such as InP alloy, for example.

The thickness of the thin dielectric layer 8 is generally much less than the thickness of the buried layer of standard SOI substrates. Indeed, typically, the thickness of the buried silicon oxide layer of a standard SOI substrate is more than 500 nm or 1 μm and, generally, less than 10 μm or 20 μm. It is therefore necessary, when manufacturing the photonic chip 2, for the buried layer of a standard SOI substrate to be thinned, while maintaining good precision with respect to its thickness in order to manufacture this thin dielectric layer 8.

To this end, the photonic chip 2 comprises a plurality of pads evenly distributed over the entire horizontal face of the layer 22. In order to simplify the figures, only one pad 50 is shown. In this case, the other pads of the photonic chip 2 are structurally identical to the pad 50 except that they are located at other sites on the upper face of the layer 22. Under these conditions, hereafter, only the pad 50 is described in detail and numerical reference 50 is also used to collectively denote all these pads of the photonic chip 2.

The pad 50 vertically extends from a face 52 flush with the upper face of the layer 22, to a face 54 that is referred to in this text as "embedded face". The face 54 is flush with the upper face of the thin dielectric layer 8 in this embodiment. Therefore, in this case it is located at the interface between the layers 8 and 26. Thus, the pad 50 completely passes through the layers 8 and 24.

The pad 50 is a straight cylinder with vertical generating lines. Its horizontal section is, for example, rectangular or circular. The surface area of the face 54 is typically greater than 1 μm 2 or 5 μm$^2$ and, generally, less than 50 μm$^2$ or 20 μm$^2$. The density of the pads 50 in the photonic chip 2 is greater than 10% and, preferably, greater than or equal to 20%. Advantageously, the density of the pads 50 is also less than 40% or 30%. In this embodiment, the density of the pads 50 is equal to 20%. The density of the pads 50 is equal to the ratio $C_{54}/S_{22} \times 100$, where:

$C_{54}$ is the total of the surface areas of the faces 54 of all the pads 50 of the photonic chip 2;

$S_{22}$ is the total surface area of the upper horizontal face of the layer 22;

the symbol "x" denotes the scalar multiplication operation.

The face 54 is made of a material that allows this face 54 to be used as a barrier layer when thinning a buried silicon oxide layer. Therefore, the face 54 is made of a material different from silicon oxide. For example, in this first embodiment, the face 54 is made of silicon nitride. More specifically, in this embodiment, the pad 50 comprises a core 56 made of silicon oxide and a thin film 58 made of silicon nitride that covers this core 56.

The method for manufacturing the photonic chip 2 will now be described with reference to the flow chart of FIG. 2 and with reference to FIGS. 3 to 11.

Initially, during a step 80, a standard SOI substrate 82 is provided (FIG. 3). The substrate 82 comprises a stack of the following three layers immediately stacked on top of each other, from the bottom to the top:

a support 84;

a buried layer 86 of silicon oxide; and a layer 88 of single-crystal silicon.

For example, the support 84 is made of silicon. Its thickness is conventionally greater than 400 μm or 700 μm.

The thickness of the buried layer 86 is conventionally greater than 500 nm or 1 μm and, generally, less than 10 μm or 20 μm.

In the particular case where the part 4 is an electrode of a phase modulator, during a step 90, the layer 88 of single-crystal silicon undergoes localized doping one or more times at the site where the part 4 must be formed.

During a step 91, the pads 50 are produced. In this case and to this end, during an operation 92, a cavity 94 (FIG. 4) is produced at the site of each pad 50. The cavity 94 completely passes through the layer 88 of single-crystal silicon and has a bottom 96 that is located inside the layer 86. The bottom 96 extends horizontally. It is located at a depth $P_{96}$ inside the layer 86. The depth $P_{96}$ is measured from the upper surface of the layer 86. The depth $P_{96}$ is less than, and typically two or five times less than, the thickness $e_{86}$ of the layer 86. Preferably, the depth $P_{96}$ is less than 150 nm or 100 nm. In this case, the depth $P_{96}$ is equal to the thickness $e_8$ of the thin dielectric layer 8 and is therefore less than 30 nm.

In this case, the cavity 94 is, for example, hollowed out implementing one or more chemical etching techniques.

Selecting the shallow depth $P_{96}$ increases the precision over this depth. Indeed, if the precision of the etching of the layer 86 is plus or minus 5%, then, if the depth $P_{96}$ is equal to 100 nm, this corresponds to a maximum error of plus or minus 5 nm. Conversely, if the depth $P_{96}$ is much greater, for example, equal to 1 μm, then the maximum error is plus or minus 50 nm and therefore ten times greater. Thus, by limiting the depth $P_{96}$, the precision is increased.

During an operation 100, the masking layer 36 of dielectric material is deposited onto the entire upper surface. This layer 36 covers the entire upper surface of the layer 88 of single-crystal silicon. A portion of this layer 36 also covers the bottom 96 of the cavity 94 and forms the film 58 of the pad 50.

The thickness of the layer 36 along the vertical walls of the cavity 94 is more difficult to control than the thickness of the layer 36 along the horizontal faces. Thus, in order to ensure that the core 56 is systematically isolated from the layer 86 by the film 58, in this case, the thickness $e_{36}$ of the layer 36 is selected so as to be greater than the depth $P_{96}$. Under these conditions, the core 56, which is formed during the next step, is only located above the layer 86.

During an operation 104, the centre of the cavity 94 is filled with a material different from silicon in order to form the core 56. In this case, the cavity 94 is filled, at this stage, with silicon oxide. For example, a silicon oxide layer that is thicker than the remaining depth of the cavity 94 is deposited. This silicon oxide layer is deposited, for example, onto the entire upper surface of the masking layer 36 implementing a chemical vapour deposition method such as the method known as PECVD (Plasma Enhanced Chemical Vapour Deposition).

Then, the upper surface is polished using the layer 36 as the barrier layer for this polishing. The state shown in FIG. 6 is then obtained. The production of the pad is then completed.

During a step 110, the layer 88 of single-crystal silicon is structured in order to notably form the part 4 of an optical component.

To this end, during an operation 112, the masking layer 36 is etched in order to leave residues 34 of this masking layer 36 only above the sites where part of an optical component must be produced. The state shown in FIG. 7 is then obtained on completion of the operation 112.

Preferably, the total of the surface areas of the upper faces of the residues 34 obtained on completion of the operation 112 is greater than 10% and, preferably, greater than or equal to 20% of the horizontal surface area of the layer 88. To this end, in this case, residues 34 are formed around each of the produced pads 50 in order to increase the remaining silicon nitride surface area and thus be able to use these residues 34 as a barrier layer during a subsequent step.

During an operation 114, the layer 88 is etched through the etching mask formed by the residues 34. For example, during this operation 114, an etchant that dissolves the single-crystal silicon is applied to the upper face of the etching mask. This etchant can be liquid or gaseous.

Figures 7, 8, 9, 10, 11, 13:
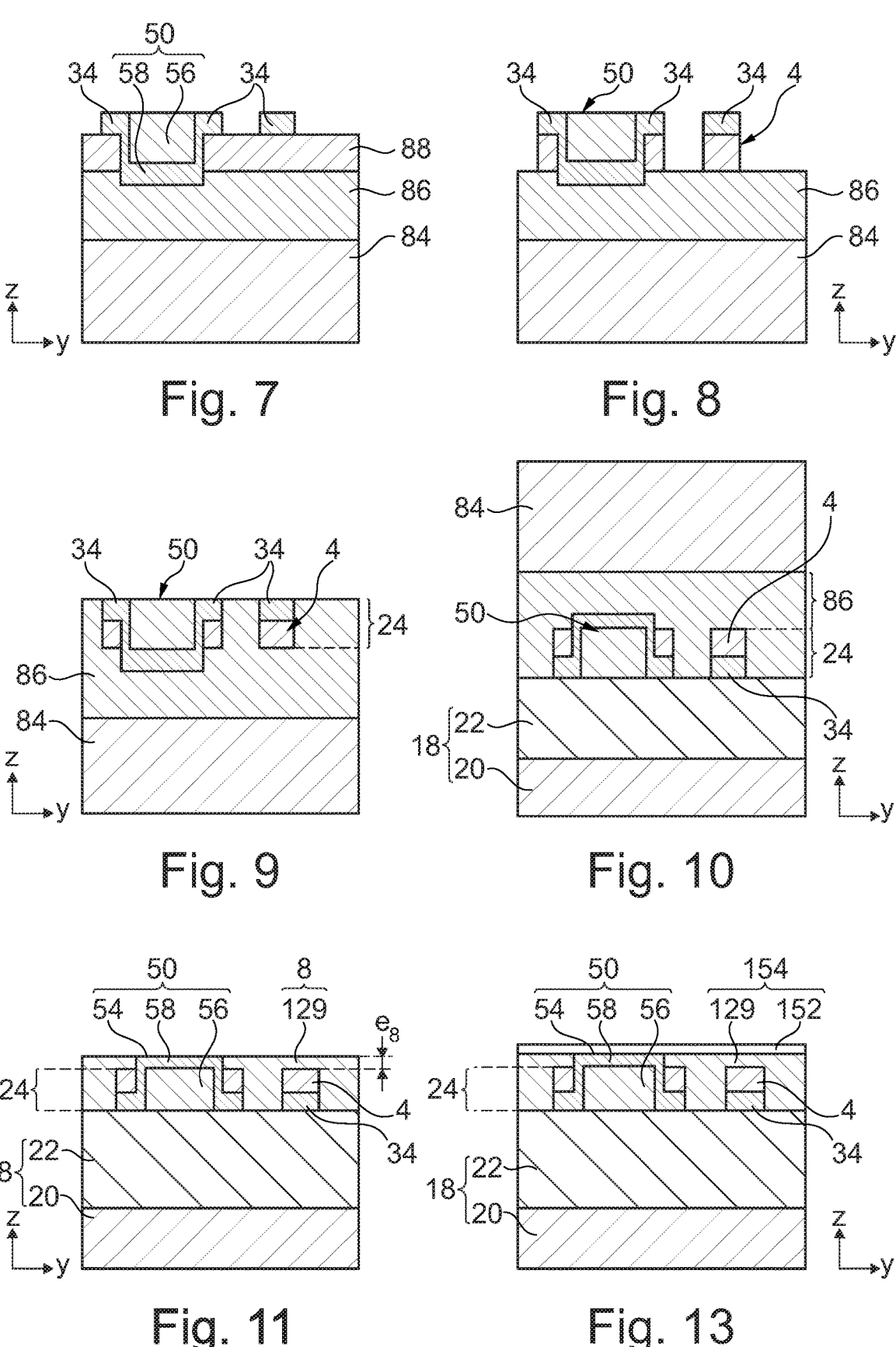
FIG. 13 is a schematic and partial illustration, as a vertical section view, of a manufacturing state obtained by implementing the method of FIG. 12.

On completion of the operation 114, the state shown in FIG. 8 is obtained. Etching the layer 88 forms hollows at the sites where the single-crystal silicon has been removed. Step 110 of structuring the single-crystal silicon is then completed and the part 4 of an optical component is obtained.

During a step 120, the structured layer of single-crystal silicon is encapsulated in the encapsulation material 32 in order to form the layer 24 of encapsulated single-crystal silicon. On completion of step 120, the state shown in FIG. 9 is obtained. During step 120, a layer of the encapsulation material 32 is deposited onto the entire upper surface of the etching mask. This layer of material 32 completely fills the hollows in the single-crystal silicon layer. To this end, the thickness of the layer of encapsulation material 32 is greater than the depth of the hollows to be filled. For example, the layer of encapsulation materials 32 is deposited using a chemical vapour deposition method. Subsequently, the encapsulation material 32 that is located outside the hollows is removed and the upper face of the layer 24 is prepared for bonding, for example, direct or molecular bonding. To this end, the upper face of the layer 24 is polished using a CMP ("Chemical-Mechanical Polishing") method. This CMP method is stopped when the upper face of the residues 34 is exposed.

During a step 124, the substrate 18 is bonded to the layer 24. The state shown in FIG. 10 is then obtained. In FIG. 10 and in the following figure, the stack of layers 84, 86 and 24 is turned over, so that the layer 24 is now at the bottom of this stack with its face bonded to the upper face of the layer 22 of the substrate 18. For example, during step 124, the layer 24 is bonded to the layer 22 by molecular bonding, i.e., without the addition of any external material.

During a step 126, the substrate 84 is removed in order to expose the rear face of the buried layer 86.

Then, during a step 128, the buried layer 86 is thinned in order to leave only a residual layer 129 of silicon oxide deposited on the layer 24. This residual layer 129 in this case forms the whole of the thin dielectric layer 8. The state shown in FIG. 11 is then obtained.

During step 128, thinning of the layer 86 is stopped by using the embedded faces 54 of the pads 50 as a barrier layer. In other words, thinning of the layer 86 is stopped as soon as the embedded faces 54 are exposed.

Since the embedded faces 54 are located at the depth $P_{96}$ inside the buried layer 86, when thinning of the buried layer 86 is stopped, the thickness $e_{129}$ of the residual layer 129 is exactly equal to the depth $P_{96}$. In this first embodiment, the thickness $e_{129}$ is equal to the thickness es of the thin dielectric layer 8. Thus, using the pads 50 allows the thin dielectric layer 8 to be produced simply with a high degree of precision with respect to its thickness. For example, thinning the buried layer 86 is carried out using a CMP method.

During a step 130, the part 6 of an optical component is produced on the thin dielectric layer 8.

Then, during a step 132, the produced part 6 of an optical component is encapsulated in the dielectric material 38 in order to obtain the layer 26. For example, steps 130 and 132 are carried out as described in application US 2017/0237229.

On completion of steps 130 and 132, the photonic chip 2 shown in FIG. 1 is obtained.

Then, additional steps are implemented in order to complete the manufacture of the photonic chip 2. For example, in the particular case where the optical component is a modulator, a step of producing electric contacts on the parts 4 and 6 is carried out.

Figures 12, 14:
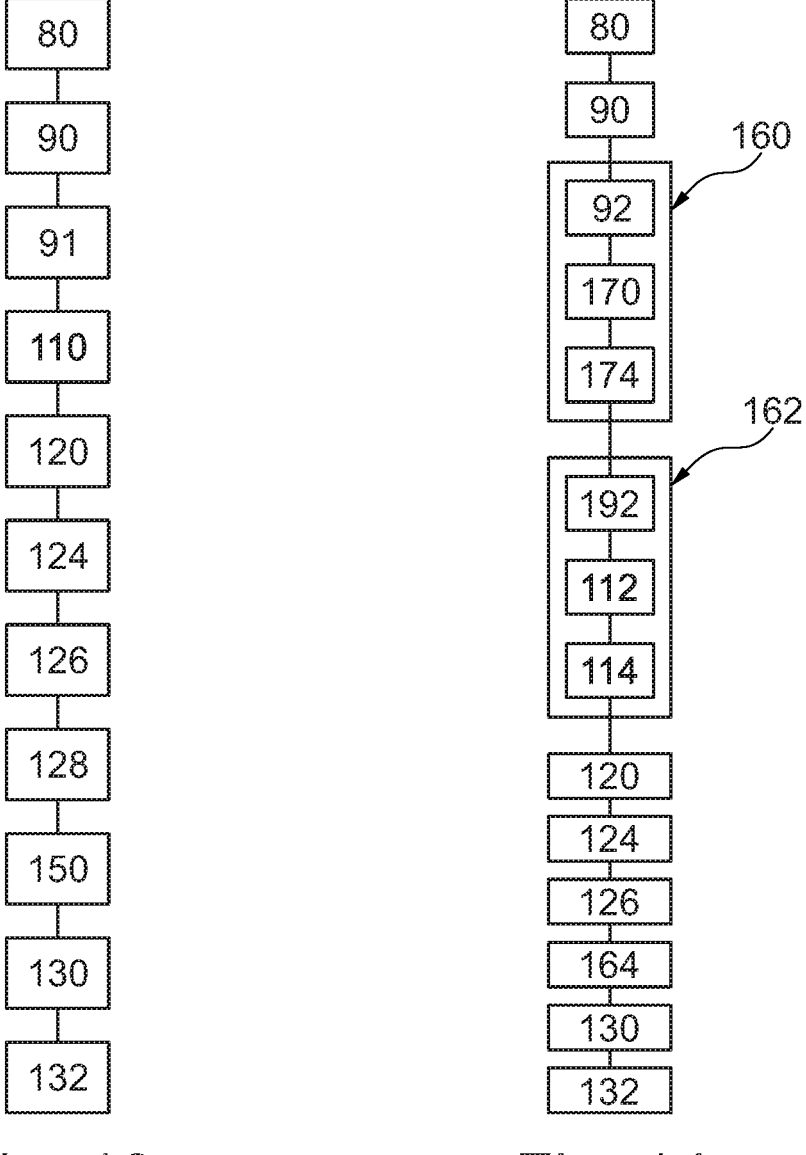
FIG. 12 is a flow chart of a first alternative embodiment of the manufacturing method of FIG. 2.
FIG. 14 is a flow chart of a second alternative embodiment of the manufacturing method of FIG. 2.

FIG. 12 shows a first alternative embodiment of the manufacturing method of FIG. 2. This first alternative embodiment is identical to the manufacturing method of FIG. 2 except that a step 150 is introduced between steps 128 and 130.

Step 150 is a step of depositing an additional dielectric layer 152 (FIG. 13) directly onto the residual layer 129 obtained on completion of step 128. The state obtained on completion of step 150 is shown in FIG. 13. In this alternative embodiment, it is the stacking of the residual layer 129 and of the additional dielectric layer 152 that forms a thin dielectric layer 154 through which the parts 4 and 6 are coupled. The thin layer 154 is functionally identical to the thin layer 8. However, in this alternative embodiment, the thin layer 154 is generally thicker than the thin layer 8. Thus, this alternative embodiment is rather intended for producing parts 4 and 6 of optical components optically coupled through the thin layer 154. The additional dielectric layer 152 is made of silicon oxide or another dielectric material such as silicon nitride. Depositing this additional dielectric layer 152 hardly degrades the precision with respect to the thickness of the thin layer 154 located between the parts 4 and 6 of optical components. Indeed, the precision with respect to the thickness of the dielectric layer 152 obtained by depositing dielectric material is much higher than the precision with respect to the thickness of a dielectric layer obtained by thinning a thicker dielectric layer. For example, in this alternative embodiment, the thickness of the residual layer 129 ranges between 30 nm and 50 nm and the thickness of the additional dielectric layer 152 ranges between 50 nm and 150 nm.

FIG. 14 shows a second alternative embodiment of the method of FIG. 2. This second alternative embodiment is identical to the method of FIG. 2 except that steps 91, 110, 128 are replaced by steps 160, 162, 164, respectively.

The step 160 is identical to the step 91 except that the operations 100 and 104 are replaced by the operations 170 and 174, respectively.

The operation 170 is an operation for oxidizing the single-crystal silicon in order to form a layer 176 (FIG. 15) of thermal oxide that covers the entire upper surface of the layer 88 of single-crystal silicon, as well as the portions of the vertical walls of the cavity 94 made of single-crystal silicon.

The layer 176 thus obtained does not cover the walls of the cavity 94 made of silicon oxide. Thus, the layer 176 does not cover the bottom 96 of the cavity 94 since this bottom is made of silicon oxide.

The operation 174 is an operation for filling the cavity 94 with a filler material different from silicon oxide. In this embodiment, the filler material is polycrystalline silicon. To this end, the procedure is as described for the operation 104 except that:

instead of depositing silicon oxide, polycrystalline silicon is deposited; and polishing the upper face uses the layer 176 as a barrier layer.

Figure 15:
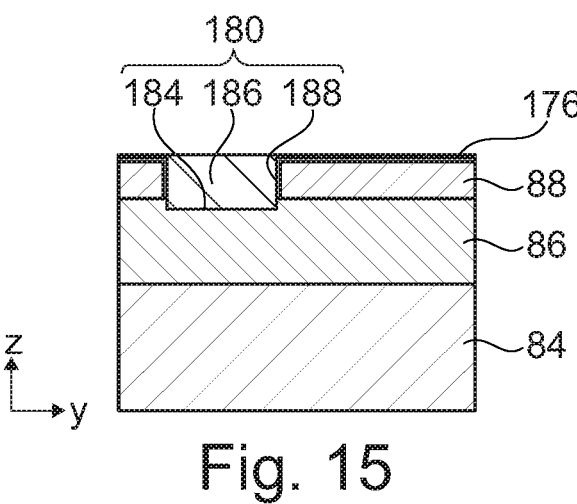
FIGS. 15 to 17 are schematic and partial illustrations, as a vertical section view, of various manufacturing states obtained by implementing the method of FIG. 14.

On completion of the step 160, the state shown in FIG. 15 is obtained. In FIG. 15, the produced pad is denoted using reference number 180. This pad 180, like the previously described pad 50, comprises:

an embedded face 184 that extends horizontally inside the layer 86 to the depth $P_{96}$;

a polycrystalline silicon core 186; and a silicon oxide film 188 that covers the portion of the vertical faces of the core 186 located inside the silicon layer 88.

Figure 16:
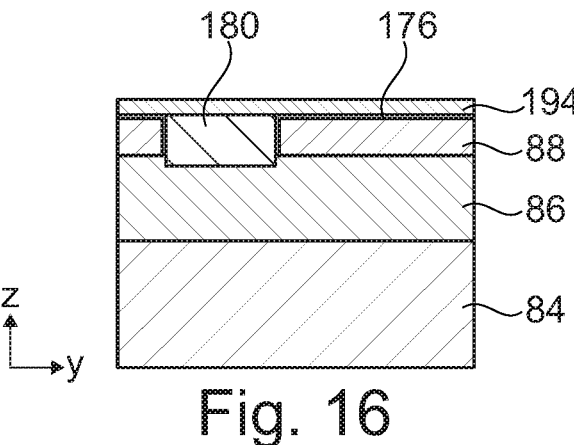

The step 162 is identical to the step 110 except that it comprises, before the operation 112, an operation 192 of depositing a masking layer 194 (FIG. 16) on the upper faces of the pads 180 and the thermal oxide layer 176. On completion of the operation 194, the state shown in FIG. 16 is obtained.

For example, the masking layer 194 is identical to the masking layer 36 except that, in this alternative embodiment, this layer 194 additionally covers the upper faces of the pads 180. Furthermore, during the operation 192, the thickness of the deposited layer 194 can be less than the depth $P_{96}$.

During the step 112, it is the masking layer 194 that is etched in order to leave the residues 34 only above the sites of the layer 88 of single-crystal silicon that must not be etched. In this alternative embodiment, the upper face of each pad 180 is completely covered by a respective residue 34 in order to protect the polycrystalline silicon core 186 during the subsequent etching operation 114. This simply allows a larger cumulative horizontal area of residue 34 to be obtained than with the method of FIG. 2, and therefore allows a barrier layer used during the step 120 to be obtained with a larger surface area.

Figure 17:
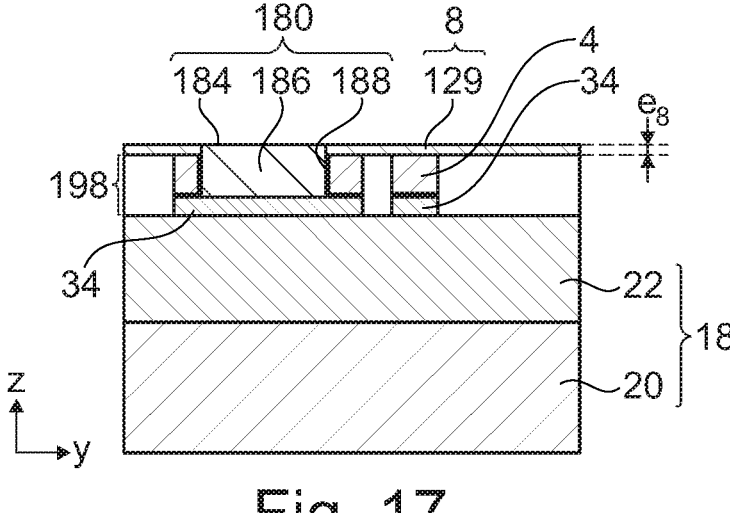

The step 164 is identical to the step 128 except that it is the buried face 184 that is used as a barrier layer. On completion of the step 164, the state shown in FIG. 17 is obtained. In FIG. 17, the encapsulated layer of single-crystal silicon is denoted using reference number 198 and functionally corresponds to the layer 24 of the photonic chip 2.

The following steps are identical to those described in the case of FIG. 2.

Chapter III: Alternative Embodiments

Alternative Embodiments of the Method of FIG. 2:

The cavities 94 can be filled with any other filler material different from silicon. For example, the cavities are filled with silicon nitride.

In the event that the filler material is different from silicon oxide or if the thickness of the masking layer 36 deposited onto the vertical walls of the cavity 94 is systematically enough to properly isolate the core 56 from the buried layer 86, then the thickness $e_{36}$ of the layer 36 can be less than the depth $P_{96}$.

Alternative Embodiments of the Method of FIG. 14:

The polysilicon used to fill the cavities 94 can be replaced by any material, different from silicon oxide, that can be polished using a CMP method while stopping on the thermal oxide layer. For example, polysilicon can be replaced by polygermanium or silicon nitride.

The masking layer 194 can be made of a material other than silicon nitride. For example, as an alternative embodiment, the masking layer 194 is made of titanium nitride or silicon oxide.

As an alternative embodiment, the masking layer 194 is completely removed after structuring the layer 88 of semiconductor material. For example, in this case, the masking layer is made of a photosensitive material such as a photosensitive resin.

Alternative Embodiments Common to all the Manufacturing Methods:

Other dielectric encapsulation materials can be used instead of silicon oxide to encapsulate the single-crystal silicon. However, preferably, the selected encapsulation material has similar optical and electrical properties to silicon oxide. Furthermore, preferably, the selected encapsulation material can be deposited using chemical vapour deposition and advantageously using a PECVD method. For example, as an alternative embodiment, the dielectric encapsulation material is tetraethyl orthosilicate, better known as TEOS, or silane.

Other shapes are possible for the pads 50. For example, the horizontal cross-section of the pads 50 can assume any shape. The horizontal cross-sections of all the pads of the photonic chip 2 do not need to be identical. For example, as an alternative embodiment, a portion of the pads of the photonic chip has a rectangular cross-section, while another portion of the pads has a different horizontal cross-section, for example, circular.

In the case where the parts 4 and 6 of the optical components do not need to be doped, then the step 90 of doping these parts 4 and 6 is omitted.

Other embodiments of the operation 114 for etching the layer of single-crystal silicon are possible. For example, in order to structure, in the layer of single-crystal silicon, a part of an optical component that has multiple thicknesses, a multi-level etching operation can be implemented.

The step 128 of thinning the buried layer can be carried out by means other than chemical mechanical polishing. For example, as an alternative embodiment, the thinning is carried out using only chemical etching. In this latter case, the chemical etching is stopped as soon as components originating from the etching of the embedded faces 54 are detected in the bath of etchant used to carry out this chemical etching.

In another alternative embodiment, the step 128 of thinning the buried layer comprises a first and a second thinning operation. The first thinning operation is a thinning operation that stops on the embedded faces 54 of the pads 50. This first thinning operation is identical to that described in the previous embodiments. This first thinning operation allows the residual layer 129 to be obtained. On completion of the first thinning operation, the second thinning operation is executed in order to thin the residual layer 129. The first and second thinning operations differ from each other in terms of the chemistry and/or physics involved. For example, typically, the etchant used during the second thinning operation is different from the etchant used during the first thinning operation. In particular, during the second thinning operation, the etchant is a non-selective etchant that etches the silicon oxide and the embedded face 54 of the pads at the same rate. Conversely, during the first thinning operation, the etchant that is used does not need to etch the silicon oxide and the embedded faces 54 of the pads at the same rate. For example, the first thinning operation is used to obtain the residual layer 129 with a thickness ranging between 40 nm and 150 nm, then the second thinning operation is used to obtain a thin dielectric layer with a thickness of less than 30 nm.

The parts of optical components can be optically or capacitively coupled to each other through the thin dielectric layer. In the case of optical coupling, the desired thickness for the thin dielectric layer is generally greater than the desired thickness for the thin dielectric layer in the case of capacitive coupling.

The electric contacts and the electric interconnections can be produced in the substrate 18 or in an additional interconnection layer deposited onto the layer 26.

The semiconductor material 30 that is used is not necessarily single-crystal silicon. For example, as an alternative embodiment, the semiconductor material is germanium or silicon carbide. In the case of germanium, the initial stack from which the manufacturing method begins is then known using the acronym GOI ("Germanium-On-Insulator").

Several of the embodiments described herein can be combined with each other.

Chapter III: Advantages of the Described Embodiments

Using the embedded faces of the pads 50, 180 as barrier faces when thinning the buried layer 86 increases the precision with respect to the thickness of the resulting residual layer 129. Ultimately, this limits the dispersion of the features of the photonic chips manufactured according to the manufacturing methods described herein. Furthermore, this manufacturing method remains compatible with the use of standard SOI substrates, i.e., with the use of SOI substrates in which the thickness of the buried layer is greater than several hundred nanometers. Finally, the residual layer 129 is obtained without complete removal of the buried layer 86 after the substrate has been turned over. Such a complete removal of the buried layer is disadvantageous in that the complete removal of the buried layer 86 is then stopped by using the structured semiconductor material as a barrier layer. This leads to an increase in the roughness of the parts of optical components manufactured in the semiconductor material and therefore to a degradation of the performance capabilities of the manufactured photonic chip. Furthermore, the complete removal of the buried layer increases the consumption of silicon oxide. By avoiding the complete removal of the buried layer 86, the methods described herein avoid these disadvantages.

The use of a thermal oxide layer 176 as a barrier layer when producing the pads 180 avoids an operation of depositing another material in order to form this barrier layer.

Depositing the masking layer 194 even above the pads 180 allows a masking layer to be obtained with a larger surface area than when the method of FIG. 2 is implemented in order to produce the same photonic chip. In other words, the density of masking material on the face to be polished at the end of the encapsulation step is greater. The higher density of masking material on the face to be polished allows a flatter layer of encapsulated semiconductor material to be obtained, since the masking layer is also used as a barrier layer for the polishing of the layer of encapsulated semiconductor material. Ultimately, this improves the bonding of the substrate 18 to the layer 198 of encapsulated semiconductor material.

Using the same layer 36 to form the etching mask and the embedded faces 84 of the pads 50 simplifies the manufacturing method. In particular, this provides the possibility of using silicon oxide as a filler material for the cavities 94.

The fact that the thickness $e_{36}$ of the masking layer 36 is greater than the predetermined depth $P_{96}$ allows the core 56 of the pad 50 to be made of silicon oxide, thus simplifying the manufacturing method.

The fact that the etching mask formed on the layer 88 of single-crystal silicon covers more than 10% of the upper horizontal surface of this layer 88 also allows this etching mask to be used as a barrier layer when polishing the layer 24 of encapsulated semiconductor material. This simplifies the manufacturing method.

The fact that the depth $P_{96}$ is less than 150 nm allows the precision to be increased with respect to the thickness of the resulting residual layer 129. Indeed, the margin of error with respect to the depth $P_{96}$ is typically plus or minus 5% with conventional etching methods. The magnitude of the error with respect to the thickness of the residual layer 129 is therefore less than 7.5 nm. This is much more precise than when known methods are implemented in order to form such a residual silicon oxide layer.

The fact that the total of the buried surface areas 54 represents more than 10% of the surface area of the buried layer improves the flatness of the residual layer 129.

The invention claimed is:

1. A method for manufacturing a photonic chip, comprising:
   providing a first stack successively comprising a support, a buried layer of silicon oxide and a layer of semiconductor material; then structuring the layer of semiconductor material in order to produce at least a first part of an optical component in the layer of semiconductor material; then encapsulating the structured layer of semiconductor material in a dielectric encapsulation material in order to obtain a layer of semiconductor material encapsulated in a dielectric material; then
   bonding a substrate to the layer of encapsulated semiconductor material; then
   removing the support in order to expose the buried layer; then
   thinning the buried layer in order to leave a residual silicon oxide layer on the layer of encapsulated semiconductor material on a side where the support was removed; then
   producing a second part of an optical component on the residual silicon oxide layer, the second part of an optical component being coupled to the first part of the optical component through the residual silicon oxide layer by optical or capacitive coupling;
   wherein:
   before bonding the substrate, the method comprises producing indented pads inside the buried layer, with each of the pads comprising an embedded face that extends parallel to an interface between the buried layer and the layer of semiconductor material to a predetermined depth inside the buried layer, with each of the embedded faces being made of a material different from the silicon oxide of the buried layer; and
   thinning the buried layer comprises an operation involving stopping as soon as the embedded face of the pads is exposed.

2. The method according to claim 1, wherein producing the indented pads comprises, before structuring the layer of semiconductor material:
   producing, at a site of each pad, a cavity that passes through the layer of semiconductor material and a bottom of which extends parallel to the interface between the buried layer and the layer of semiconductor material to the predetermined depth inside the buried layer; then
   oxidizing the layer of semiconductor material in order to obtain a thermal oxide layer that covers the layer of semiconductor material; then
   filling each cavity with a filler material different from the silicon oxide of the buried layer; then polishing, while stopping on the thermal oxide layer, a face by which the cavities were filled with the filler material in order to remove the filler material outside the cavities.

3. The method according to claim 2, wherein:
   structuring the layer of semiconductor material comprises:
   depositing a masking layer that covers the produced indented pads and the entire layer of semiconductor material, the masking layer being made of a material different from the semiconductor material; then
   etching the masking layer and the thermal oxide at sites where the layer of semiconductor material must be removed in order to obtain an etching mask; then
   etching the layer of semiconductor material through the resulting etching mask, forming hollows in the layer of semiconductor material at the sites where the semiconductor material is etched; and
   encapsulating the layer of semiconductor material comprises:
   filling the hollows with the dielectric encapsulation material; then
   polishing, while stopping on the masking layer, a face by which the hollows have been filled with the dielectric encapsulation material in order to remove the dielectric encapsulation material located outside the hollows.

4. The method according to claim 1, wherein:
   producing the indented pads comprises, before structuring the layer of semiconductor material:
   producing, at a site of each pad, a cavity that passes through the layer of semiconductor material and a bottom of which extends parallel to the interface between the buried layer and the layer of semiconductor material to the predetermined depth inside the buried layer; then
   depositing a masking layer that covers the entire layer of semiconductor material and the bottom of each cavity, the masking layer being made of a material different from the silicon oxide of the buried layer and different from silicon; and
   filling each cavity with a filler material different from the semiconductor material; and
   structuring the layer of semiconductor material comprises:
   etching the masking layer at sites where the layer of semiconductor material must be removed in order to obtain an etching mask; then
   etching the layer of semiconductor material through the resulting etching mask, with said etching forming hollows in the layer of semiconductor material at the sites where the semiconductor material is etched.

5. The method according to claim 4, wherein a thickness of the masking layer is greater than the predetermined depth.

6. The method according to claim 4, wherein:
   the resulting etching mask covers at least ten percent of the surface of the layer of semiconductor material before it is etched; and
   encapsulating the layer of semiconductor material comprises:
   filling the hollows with the dielectric encapsulation material; then
   polishing, while stopping on the masking layer, a face by which the hollows were filled with the dielectric encapsulation material in order to remove the dielectric encapsulation material outside the hollows.

7. The method according to claim 1, wherein the predetermined depth is less than 150 nm.

8. The method according to claim 1, wherein a total of surface areas of the embedded faces is greater than 10% of a surface area of the buried layer.

9. The method according to claim 1, wherein the semiconductor material is single-crystal silicon.

10. The method according to claim 1, wherein, when encapsulating the layer of semiconductor material, the dielectric encapsulation material used to encapsulate the semiconductor material is a silicon oxide.

11. The photonic chip obtained by a manufacturing method according claim 1, wherein the photonic chip comprises, successively stacked on top of each other:

a substrate;

a first layer of encapsulated semiconductor material comprising at least the first part of the optical component made of the encapsulated semiconductor material;

a dielectric layer comprising a residual silicon oxide layer; and a second layer of encapsulated semiconductor material comprising at least the second part of the optical component made of the encapsulated semiconductor material, with the second part of the optical component being coupled to the first part of the optical component through the dielectric layer by optical or capacitive coupling;

wherein the photonic chip comprises pads that each extend from an interface between the substrate and the first layer of encapsulated semiconductor material to an embedded face located between:

an interface between the dielectric layer and the first layer of encapsulated semiconductor material; and an interface between the dielectric layer and the second layer of encapsulated semiconductor material;

the embedded face of each pad being made of a material different from silicon oxide and extending parallel to the interface between the dielectric layer and the first layer of encapsulated semiconductor material.

12. The method according to claim 1, wherein the predetermined depth is less than 100 nm.

\* \* \* \* \*